US011119572B2

(12) United States Patent
Ahuja et al.

(10) Patent No.: US 11,119,572 B2
(45) Date of Patent: Sep. 14, 2021

(54) SELECTIVE DISPLAY OF OBJECTS BASED ON EYE GAZE ATTRIBUTES

(71) Applicant: International Business Machines Corporation, Armonk, NY (US)

(72) Inventors: Karan Ahuja, Vasant Kunj (IN); Kuntal Dey, Vasant Kunj (IN); Sougata Mukherjea, New Delhi (IN); Seema Nagar, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 16/675,265

(22) Filed: Nov. 6, 2019

(65) Prior Publication Data

US 2021/0132691 A1    May 6, 2021

(51) Int. Cl.
| | |
|---|---|
| *G06F 3/01* | (2006.01) |
| *G06F 3/0481* | (2013.01) |
| *G06F 16/26* | (2019.01) |
| *G06F 16/957* | (2019.01) |
| *G06Q 30/02* | (2012.01) |

(52) U.S. Cl.
CPC ............ *G06F 3/013* (2013.01); *G06F 16/957* (2019.01); *G06Q 30/02* (2013.01)

(58) Field of Classification Search
CPC .......... G06F 3/013; G06F 16/54; G06F 16/58; G06F 16/583; G06F 16/78; G06F 3/04842; G06Q 30/0631
See application file for complete search history.

(56) References Cited

U.S. PATENT DOCUMENTS

| | | | |
|---|---|---|---|
| 6,608,615 | B1 | 8/2003 | Martins |
| 8,154,615 | B2 | 4/2012 | Fedorovskaya |
| 9,116,926 | B2 | 8/2015 | Horowitz |
| 2013/0044055 | A1* | 2/2013 | Karmarkar ............ G06F 21/316 345/158 |
| 2013/0054622 | A1* | 2/2013 | Karmarkar ............ G06F 16/436 707/749 |
| 2015/0135309 | A1* | 5/2015 | Karmarkar ......... G06K 9/00617 726/19 |
| 2016/0012475 | A1 | 1/2016 | Liu |
| 2016/0259405 | A1 | 9/2016 | Wilson |
| 2017/0097679 | A1 | 4/2017 | Kempinski |
| 2017/0139556 | A1* | 5/2017 | Josephson ........... G06F 3/04847 |
| 2017/0278172 | A1 | 9/2017 | Dey |
| 2017/0330265 | A1 | 11/2017 | Liao |
| 2019/0073025 | A1* | 3/2019 | Schmidt ............. G06K 9/00684 |
| 2020/0120170 | A1* | 4/2020 | Amitay ................. H04L 67/306 |

FOREIGN PATENT DOCUMENTS

WO     2010132991 A1    11/2010

* cited by examiner

*Primary Examiner* — Alison Slater
(74) *Attorney, Agent, or Firm* — Stephen R. Yoder

(57) ABSTRACT

Selective display of available objects based on eye-gaze characteristics with respect to currently displayed objects and certain attributes of the currently displayed objects. Similarity-driven selective display compares attributes of a displayed object receiving a fixed gaze to attributes of available objects and displays similar objects in addition to the displayed object receiving the fixed gaze.

15 Claims, 5 Drawing Sheets

SELECTIVE DISPLAY OF OBJECTS BASED ON EYE GAZE ATTRIBUTES

BACKGROUND

The present invention relates generally to the field of data processing, and more particularly to selective display of objects in a digital environment.

A web server is dedicated to running software that satisfies world wide web client requests. A web server typically contains multiple websites. A web server processes incoming network requests over HTTP (Hypertext Transfer Protocol) and several other related protocols. The primary function of a web server is to store, process, and deliver web pages to client computers. Pages delivered by the web server are often HTML (Hypertext Markup Language) documents, which may include images, style sheets, and scripts in addition to the text content.

Eye-gaze based image viewing analysis, text reading characterization, text reading difficulty analysis, scan path generation, mental health analysis, and many other eye-tracking applications are available for use.

Existing applications include social applications (such as, eye gaze based social similarity analysis), e-commerce applications (automatically adding gazed-at items to carts, capturing viewer interests toward products, remarketing), retail applications (retail rack slot analysis, retail rack product analysis, and even, retail rack location auctioning) and eye-gaze based help message pop-up.

There are several types of eye movements that may be tracked for data collection purposes. These eye movements provide insight into what is being viewed and how it is being viewed. Eye movements include: (i) saccades; (ii) smooth pursuit; (iii) vergence; (iv) vestibulo-ocular; (v) optokinetic response; and (vi) postrotatory nystagmus. It should be noted that a fixation of the eyes is often a series of saccades within such a narrow area of view that the eye remains "fixed" at a general location.

SUMMARY

In one aspect of the present invention, a method, a computer program product, and a system includes: (i) monitoring eye movement of a user for a triggering gaze while the user views a set of displayed objects; (ii) determining a first object of the set of displayed objects to be a focus of the triggering gaze; (iii) identifying a set of similar objects having a set of characteristics similar to the first object; and (iv) displaying the set of similar objects in addition to the first object.

DETAILED DESCRIPTION

Figure 1:
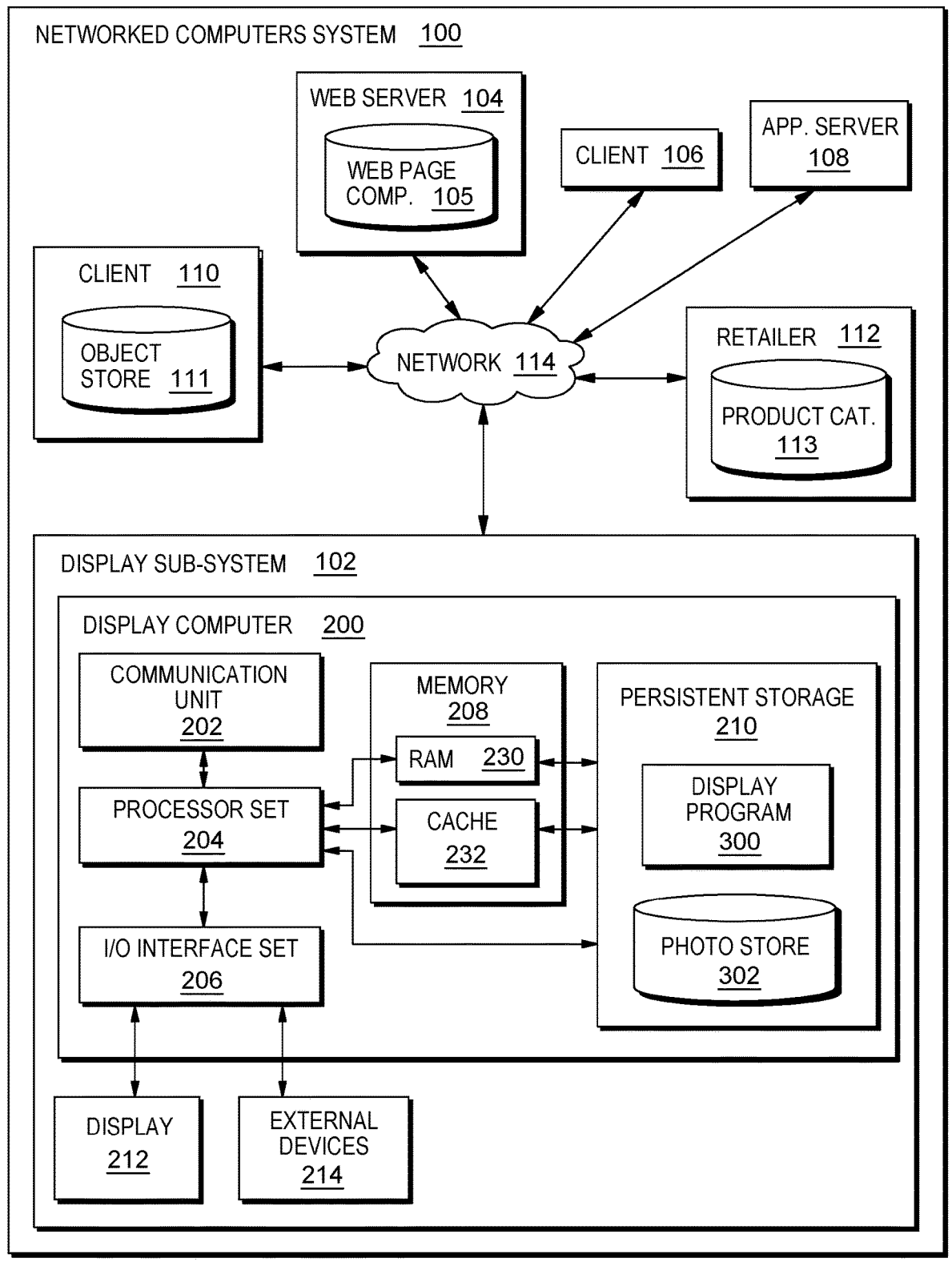
FIG. 1 is a schematic view of a first embodiment of a system according to the present invention.

Selective display of available objects based on eye-gaze characteristics with respect to currently displayed objects and certain attributes of the currently displayed objects. Similarity-driven selective display compares attributes of a displayed object receiving a fixed gaze to attributes of available objects and displays similar objects in addition to the displayed object receiving the fixed gaze. The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium, or to an external computer or external storage device via a network, for example, the Internet, a local area network, a wide area network, and/or a wireless network. The network may comprise copper transmission cables, optical transmission fibers, wireless transmission, routers, firewalls, switches, gateway computers, and/or edge servers. A network adapter card or network interface in each computing/processing device receives computer readable program instructions from the network, and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture, including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus, or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions, or acts, or carry out combinations of special purpose hardware and computer instructions.

The present invention will now be described in detail with reference to the Figures. FIG. 1 is a functional block diagram illustrating various portions of networked computers system 100, in accordance with one embodiment of the present invention, including: display sub-system 102; web server sub-system 104; web page component store 105; client sub-system 106; application server sub-system 108; client sub-system 110; object store 111; retailer sub-system 112; product catalog store 113; communication network 114; display computer 200; communication unit 202; processor set 204; input/output (I/O) interface set 206; memory device 208; persistent storage device 210; display device 212; external device set 214; random access memory (RAM) devices 230; cache memory device 232; display program 300; and photo store 302.

Sub-system 102 is, in many respects, representative of the various computer sub-system(s) in the present invention. Accordingly, several portions of sub-system 102 will now be discussed in the following paragraphs.

Sub-system 102 may be a laptop computer, tablet computer, netbook computer, personal computer (PC), a desktop computer, a personal digital assistant (PDA), a smart phone, or any programmable electronic device capable of communicating with the client sub-systems via network 114. Program 300 is a collection of machine readable instructions and/or data that is used to create, manage, and control certain software functions that will be discussed in detail below.

Sub-system 102 is capable of communicating with other computer sub-systems via network 114. Network 114 can be, for example, a local area network (LAN), a wide area network (WAN) such as the Internet, or a combination of the two, and can include wired, wireless, or fiber optic connections. In general, network 114 can be any combination of connections and protocols that will support communications between server and client sub-systems.

Sub-system 102 is shown as a block diagram with many double arrows. These double arrows (no separate reference numerals) represent a communications fabric, which provides communications between various components of sub-system 102. This communications fabric can be implemented with any architecture designed for passing data and/or control information between processors (such as microprocessors, communications and network processors, etc.), system memory, peripheral devices, and any other hardware component within a system. For example, the communications fabric can be implemented, at least in part, with one or more buses.

Memory 208 and persistent storage 210 are computer readable storage media. In general, memory 208 can include any suitable volatile or non-volatile computer readable storage media. It is further noted that, now and/or in the near future: (i) external device(s) 214 may be able to supply, some or all, memory for sub-system 102; and/or (ii) devices external to sub-system 102 may be able to provide memory for sub-system 102.

Program 300 is stored in persistent storage 210 for access and/or execution by one or more of the respective computer processors 204, usually through one or more memories of memory 208. Persistent storage 210: (i) is at least more persistent than a signal in transit; (ii) stores the program (including its soft logic and/or data), on a tangible medium (such as magnetic or optical domains); and (iii) is substantially less persistent than permanent storage. Alternatively, data storage may be more persistent and/or permanent than the type of storage provided by persistent storage 210.

Program 300 may include both machine readable and performable instructions, and/or substantive data (that is, the type of data stored in a database). In this particular embodiment, persistent storage 210 includes a magnetic hard disk drive. To name some possible variations, persistent storage 210 may include a solid state hard drive, a semiconductor storage device, read-only memory (ROM), erasable programmable read-only memory (EPROM), flash memory, or any other computer readable storage media that is capable of storing program instructions or digital information.

The media used by persistent storage 210 may also be removable. For example, a removable hard drive may be used for persistent storage 210. Other examples include optical and magnetic disks, thumb drives, and smart cards that are inserted into a drive for transfer onto another computer readable storage medium that is also part of persistent storage 210.

Communications unit 202, in these examples, provides for communications with other data processing systems or devices external to sub-system 102. In these examples, communications unit 202 includes one or more network interface cards. Communications unit 202 may provide communications through the use of either, or both, physical and wireless communications links. Any software modules discussed herein may be downloaded to a persistent storage device (such as persistent storage device 210) through a communications unit (such as communications unit 202).

I/O interface set 206 allows for input and output of data with other devices that may be connected locally in data communication with computer 200. For example, I/O interface set 206 provides a connection to external device set 214. External device set 214 will typically include devices such as a keyboard, keypad, a touch screen, and/or some other suitable input device. External device set 214 can also include portable computer readable storage media such as, for example, thumb drives, portable optical or magnetic disks, and memory cards. Software and data used to practice embodiments of the present invention, for example, program 300, can be stored on such portable computer readable storage media. In these embodiments the relevant software may (or may not) be loaded, in whole or in part, onto persistent storage device 210 via I/O interface set 206. I/O interface set 206 also connects in data communication with display device 212.

Display device 212 provides a mechanism to display data to a user and may be, for example, a computer monitor or a smart phone display screen.

The programs described herein are identified based upon the application for which they are implemented in a specific embodiment of the present invention. However, it should be appreciated that any particular program nomenclature herein is used merely for convenience, and thus the present invention should not be limited to use solely in any specific application identified and/or implied by such nomenclature.

Display program 300 operates to identify eye-gaze location and characteristics while a user views a webpage or other digital display of objects. When the eye-gaze characteristic is that of fixation, the location of the eye-gaze is associated with an object or feature of an object. A similarity search is performed and display of objects related to the object of interest are emphasized. Emphasis may be achieved by pop-up of related objects, reducing visibility of unrelated objects, performing a similarity search and generating a new display of the results.

Some embodiments of the present invention recognize the following facts, potential problems and/or potential areas for improvement with respect to the current state of the art: (i) opening all images, photos, and/or pictures on a webpage for a user to view may distract and annoy the user; (ii) Java script or other script language programming allows for creating differentiated enablement of object displays, such as enabling photos to be displayed at varying expansion thresholds; (iii) a publish-subscribe (pub/sub) architecture enabling display of objects according to varying expansion thresholds is known; (iv) attribute-based image similarity matching algorithms are commercially available including: object identification algorithms, object similarity matching algorithms, face segmentation and face similarity matching algorithms; (v) feature-based image similarity matching algorithms are commercially available including: object identification algorithms, object similarity matching algorithms, face segmentation and face similarity matching algorithms; (vi) reverse-mapping text attributes to displayed objects are achieved by commercially available software; and/or (vii) image similarity matching algorithms that are text-attribute-wise may be invoked for use with available reverse-mapping technology.

Some embodiments of the present invention are directed to resisted, or selective, loading of objects, such as still images, documents, applications, video images, according to the eye gaze behavior or pattern of a user and explicit or implicit enablement of the objects by a webpage or application developer. It should be noted that the discussion herein refers often to the object of the eye gaze to be an image, but aspects of the present invention are applicable to viewing icons on a display screen, text names of documents in a document listing, and other groups or sets of items displayed digitally to a user. Further, oftentimes objects displayed to the user are associated with descriptive metadata that may be analyzed for determination of certain characteristics of the object.

Some embodiments of the present invention load and/or show images, photos, and/or pictures that are deemed to be similar to what a user gives significant attention, according to eye-gaze metrics when viewing an image, photo, and/or picture on a computing device displaying objects on, for example, a mobile application and/or a web page. Alternatively, a group of objects may be displayed by way of image search results and the eye-gaze metrics may indicate on which image the user is focused, thus driving selective emphasis or display of related images.

Some embodiments of the present invention are directed to a system and associated methods for dynamically loading objects having similar aspects and/or attributes as an object being viewed by sufficient eye gaze of a user. According to some embodiments of the present invention, the sufficiency of an eye gaze is computed as a function of (i) frequency of eye-gaze fixations at a same location; (ii) duration of eye gaze fixation, (iii) frequency of incoming eye gaze saccades; (iv) length of incoming eye-gaze saccades; (v) viewer-specific eye-gaze profile; (vi) viewer-specific eye-gaze patterns based on an eye-gaze history; (vii) viewer-specific friendship profile applied to eye-gaze on photos in a social media setting where social strength of certain friends serves to lessen a required sufficiency of eye-gaze to load objects associated with certain friends; (viii) viewer-specific eye-gaze profile weighting strength of familiarity with an object and degree of similarity of an object to a familiar object; (ix) viewer-specific emotions displayed by the eye-gaze and/or facial features; and/or (x) typical eye-gaze behavior of other users.

Some embodiments of the present invention operate according to the notion of "resistance" of an object to be enabled, fully displayed, or otherwise activated for viewing by a user. Objects are loaded for viewing according to sufficient eye gaze being determined. Sufficiency is determined according to various metrics. In some embodiments, sufficiency refers to the type of object being gazed upon. In that way, objects will have different "resistances" to being displayed. Accordingly, some objects with attributes related to a viewed object will be displayed on a web page upon an eye gaze sufficient for that object but other objects tangentially related to the viewed object will load only after a different sufficiency requirement is met. For example, a three second eye gaze directed to a refrigerator door handle is sufficient to display other pictures of the refrigerator door but, a gaze directed to the refrigerator door handle must reach a seven second duration to be sufficient for the system to display other pictures of the refrigerator door handle.

According to some embodiments of the present invention the value of an expansion propensity function is periodically computed, enabling the decision process of whether or not to expand an object currently being viewed or other objects available for viewing on a particular webpage or running on an application. The term "expansion" as it is used herein refers to drawing the attention of the user by highlighting, making larger, or otherwise emphasizing an object similar what is the focus of the eye gaze. The term "expansion propensity" as used herein refers to the selective nature of the expansion. That is, some objects are more likely to be emphasized, or expanded, than other objects available for viewing. Expansion propensity is defined according to various data points according to a pre-defined objective.

Some data points that may define expansion propensity include: (i) the number and duration of eye gaze fixations; (ii) the number and length of incoming eye gaze saccades; (iii) the personal profile for viewing (gazing at) similar images/photos/pictures in the past; (iv) the social gazing profile where socially connected persons in an image are weighted by the profile for viewing (gazing at) similar images/photos/pictures in the past (the weight is computed according to the social strength of the connected persons in terms of strength of familiarity and degree of similarity); (v) observed emotions of the user and corresponding perspective of the user; and/or (vi) the gazing behavior of other users having similar profiles.

Some embodiments of the present invention invoke object similarity matching algorithms that operate to determine similarity between a first image and another image by labeling the objects found in the first image and counting the number of matching objects of the other image having similar attributes.

Some embodiments of the present invention provide for a user to cast an eye gaze for a specified amount of time on one set of images and another amount of time on another set of images such that a new image is loaded and pops up in a display according to one of the durations of the eye gazes.

Some embodiments of the present invention are directed to methods and systems for enabling resisted loading of images for display to a user. Aspects and/or attributes of an image that receive fixation or focus of an eye gaze trigger loading of similar images for display to a user. The eye gaze is analyzed to identify significant attention to an object by a user during a current session. Monitoring the eye gaze of the user based on specific eye gaze attributes such as number of fixations, duration of fixations, number of saccades, length/distance of saccades, individual eye gazing behavior. Other information guiding the selective loading of images for display include: individual profile data, social profile data, interests of the user viewing the image, and eye gazing behavior of other users having similar interests. Some embodiments of the present invention analyze an image of interest to determine attributes of the image and perform a search among available images to identify and display images having similar attributes.

Figure 2:
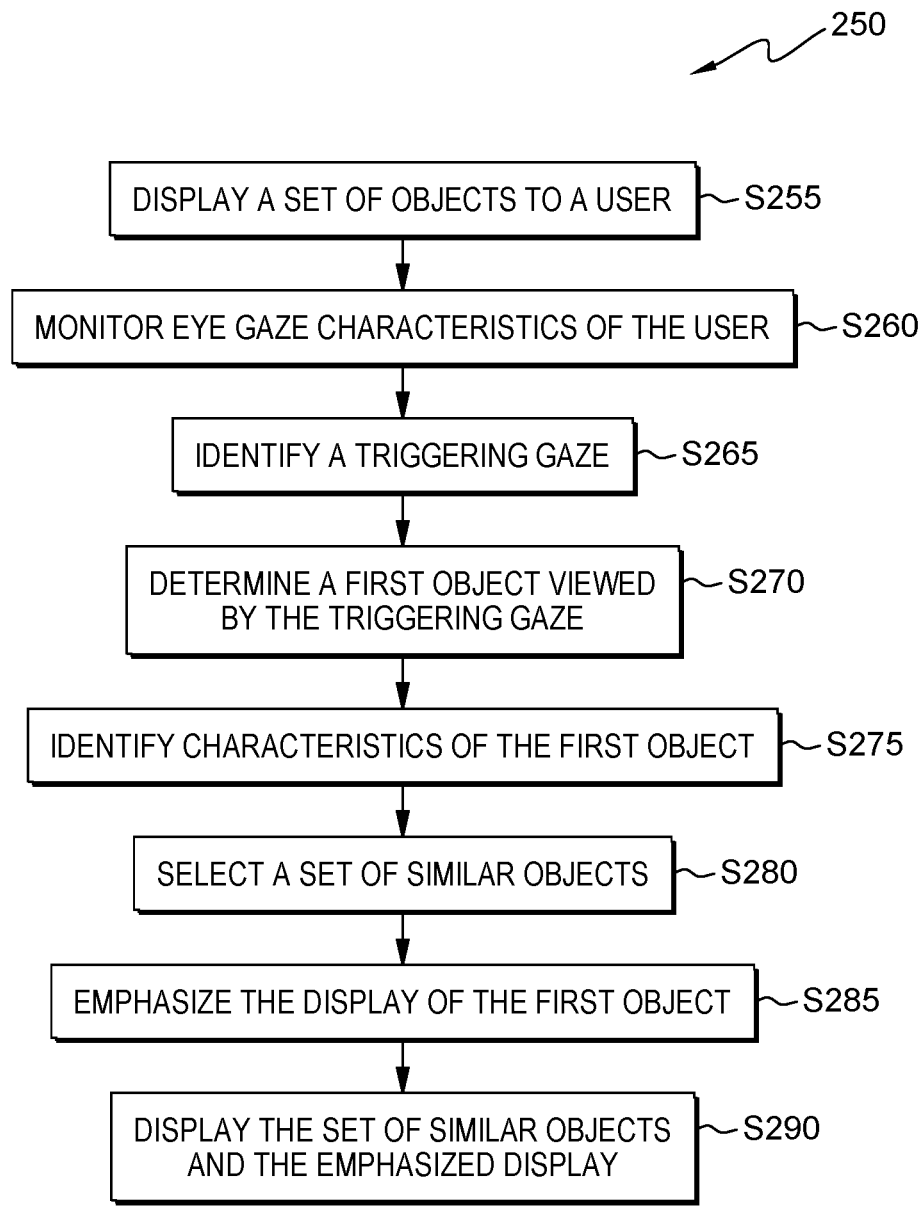
FIG. 2 is a flowchart showing a method performed, at least in part, by the first embodiment system.
Figure 3:
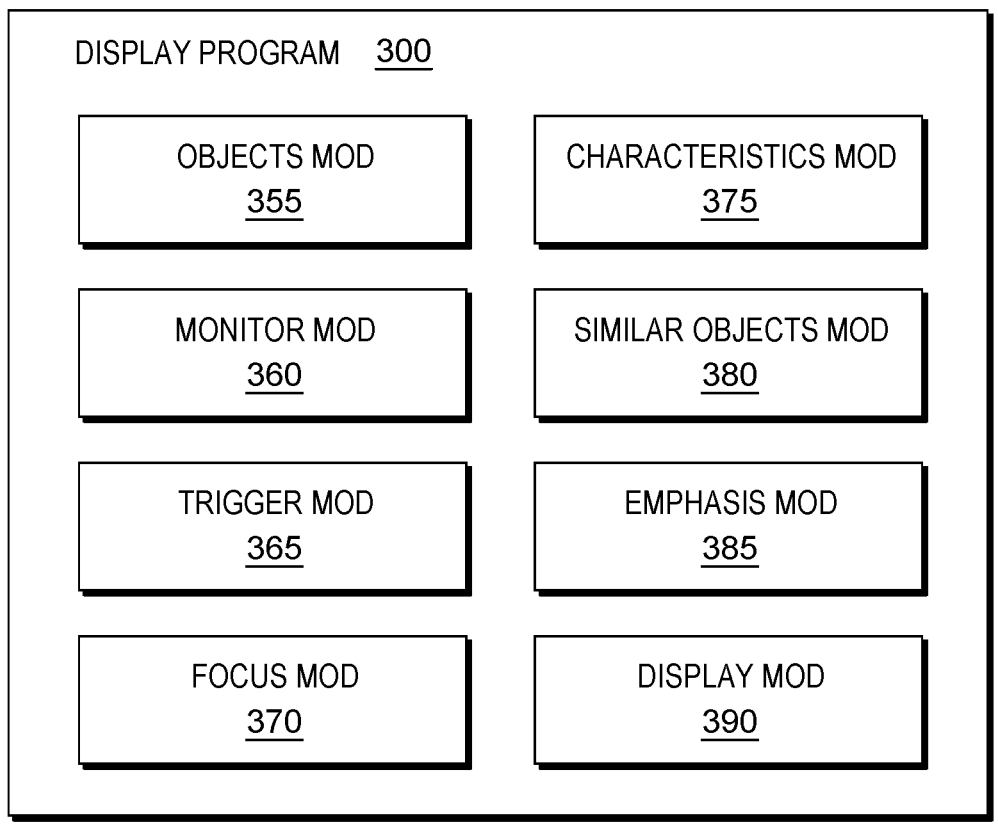
FIG. 3 is a schematic view of a machine logic (for example, software) portion of the first embodiment system.
Figure 5A:
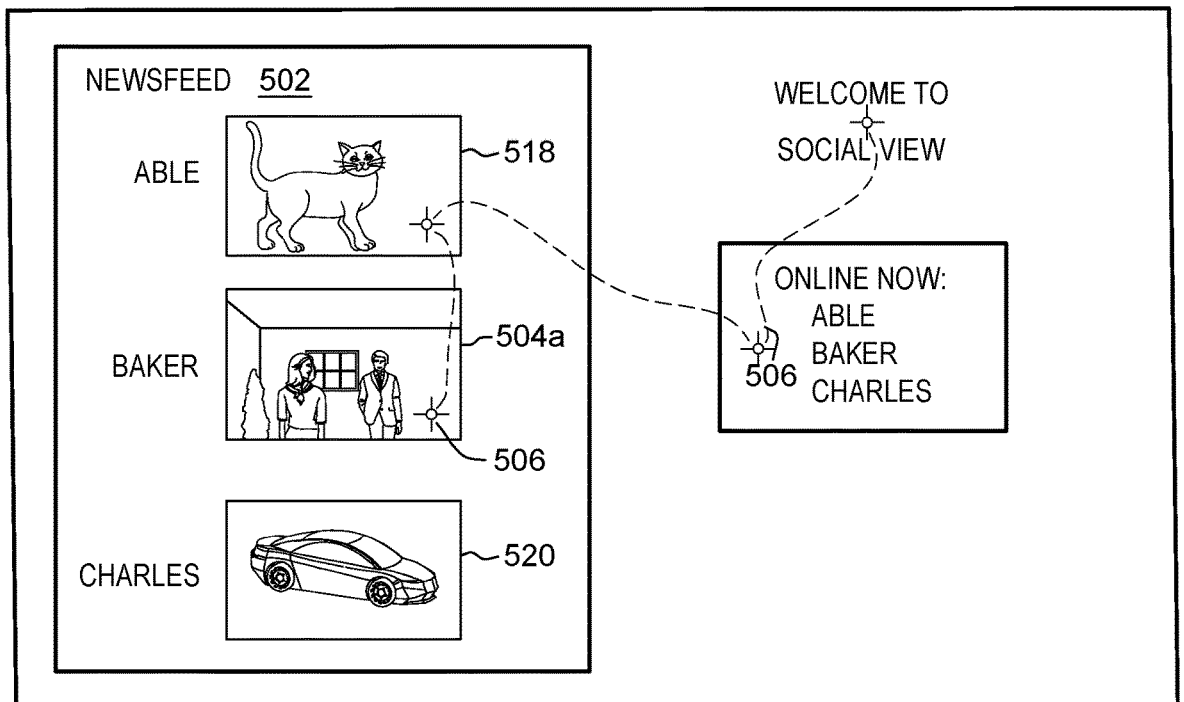
FIGS. 5A and 5B are screenshot views showing information that is generated by and/or helpful in understanding embodiments of the present invention.
Figure 5B:
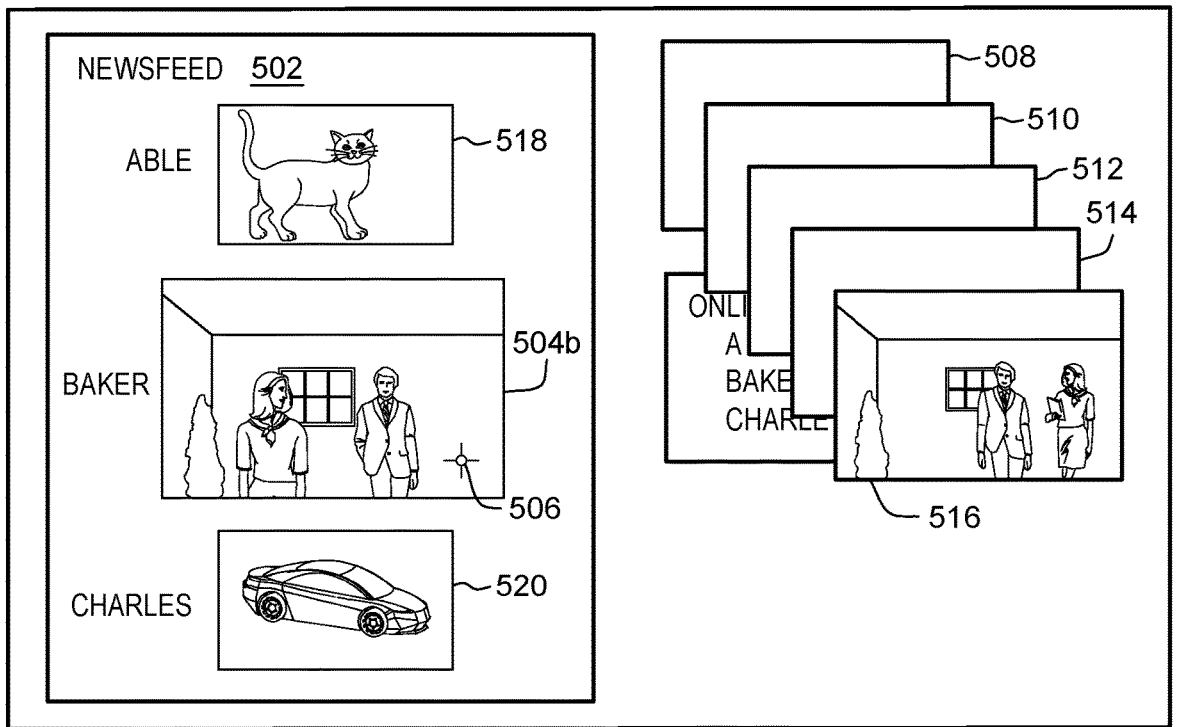

FIG. 2 shows flowchart 250 depicting a first method according to the present invention. FIG. 3 shows program 300 for performing at least some of the method steps of flowchart 250. This method and associated software will now be discussed, over the course of the following paragraphs, with extensive reference to FIG. 2 (for the method step blocks) and FIG. 3 (for the software blocks). FIGS. 5A and 5B illustrate an example implementation of some aspects of the present invention and will be referenced occasionally during the discussion that follows.

Processing begins at step S255, where objects module ("mod") 355 displays a set of objects to a user. In this example, a set of objects are displayed to the user on a digital display such as the set of objects 504a, 518, and 520 of newsfeed 502 (FIG. 5A). The displayed objects include descriptive metadata including characteristics of the associated object. Characteristics of the objects may be widely varied according to the purpose of the display. The metadata is one of the bases on which similarity of the object to other objects available for display is determined. Alternatively, a web search result includes various images. These images are displayed to the user. Alternatively, a web search result includes links to web pages or a listing of documents matching the search query. Regardless of the origin of the set of objects and whether the objects are images, documents, or web links, the results are displayed to the user for viewing according to some embodiments of the present invention.

Processing proceeds to step S260, where monitor mod 360 monitors eye gaze characteristics of the user while viewing the displayed set of objects. As described herein the eye gaze may be characterized in many different ways. The monitoring process, tracks movement of the eye or eyes of a user while viewing the displayed set of objects for a fixation or focus point of the eye with respect to a displayed object. FIG. 5A illustrates tracking of eye gaze 506 while viewing screenshot 500a. In this example, the fixation point of the eyes is identified as a series of saccades within such a narrow area of view that the eye remains "fixed" at a general location. Alternatively, the monitor mod monitors eye movement for the purpose of identifying other eye gaze characteristics described herein.

Processing proceeds to step S265, where trigger mod 365 identifies a triggering gaze. The eye gaze characteristics discussed with respect to step S260 may serve as a trigger. That is, a triggering eye gaze is a predefined characteristic of the eye gaze of the user while viewing the set of objects. When the target eye gaze characteristic is identified, a trigger gaze is the result. Alternatively, monitoring mod may identify many different characteristics of the eye gaze and a sequence of eye gaze characteristics make up the triggering gaze. For example, a triggering gaze may be defined as a period of vergence followed by a period of saccades within a narrow area. Some embodiments of the present invention require that a particular eye gaze characteristic be present for a predefined period of time to be identified as a triggering gaze.

Processing proceeds to step S270, where focus mod 370 determines a first object of the set of objects is viewed by the triggering gaze. Upon identification of a triggering gaze, the focus mod determines what object is being viewed, or is the focus of the attention, by the user. Eye tracking and monitoring devices associate the location of the triggering eye gaze with the various locations of the displayed objects so that a single object may be identified. Alternatively, the triggering eye gaze is processed to identify a feature being viewed on a larger object, such as a door on an image of a home. As shown in FIG. 5B, photo 504b represents a first object viewed by triggering gaze 506.

Processing proceeds to step S275, where characteristics mod 375 identifies characteristics of the first object. In this example, characteristics of the object are provided as metadata in the digital file of the object. Certain specified characteristics are provided as key characteristics and the key characteristics are obtained from the metadata. Alternatively, machine learning techniques are applied so that the first object is recognized, and certain characteristics are determined or identified. Alternatively, augmented intelligence is applied to the process for determining the characteristics of the object being viewed by a triggering gaze.

Processing proceeds to step S280, where similar objects mod 380 selects a set of similar objects for display to the user. Upon determining the characteristics of the object, or key characteristics in this example, the similar object mod performs a search based on the characteristics to identify objects having matching characteristics. Matching objects may be identified from various sources including product catalog 113, object store 111, and/or photo store 302 (FIG. 1). In some embodiments of the present invention a web query is generated with the key characteristics to perform a web search for the matching objects. When similar objects are found by search, the similar objects mod selects certain found objects. In this example, a count requirement limits the results to five objects. Alternatively, a similarity score is applied to the found objects such that a most similar object would have more matching characteristics than a least similar object. For example, only objects having three of the four key characteristics are selected for display to the user.

As shown in FIG. 5B, the set of similar objects 508, 510, 512, 514, 516 are displayed for viewing by the user.

Processing proceeds to step S285, where emphasis mod 385 emphasizes the display of the first object from among the set of objects. In this example, emphasis is achieved by displaying the first object double the size of the other objects and at the top of the display. Alternatively, emphasis is achieved by playing the video, where the first object is one of several videos being displayed to the user. Alternatively, emphasis includes causing other objects of the set of objects to visually fade or to be displayed in black and white while the first object remains in full display or in color. Emphasizing the display of the first object may be accomplished in many varied ways now known or to be known in the future. As shown in FIG. 5B, the first object 504b is shown in an emphasized style compared to the other objects in newsfeed 502.

Processing ends at step S290, where display mod 390 displays the set of similar objects and the emphasized display of the first object. In this example, the first object is displayed at the top of the display and the display of the other objects in the set of objects is replaced with a display of the set of similar objects. This process may lead to other objects in the similar objects receiving the triggering gaze and the process described herein repeats with the similar object that is the focus of the triggering gaze. Alternatively, the display of the set of similar objects is displayed to the user via a pop-up display. Alternatively, the set of similar objects replaces the set of objects except for the emphasized display of the first object.

Some embodiments of the present invention provide for expanding a search by loading other similar-aspect product images as the user is viewing according to the focus of the eye-gaze of the user. For example, similar-looking door handles may be displayed according to a priority over non-similar door handles. Also, a particular control panel for a washing machine may be shown photographed from a different angle when the user's gaze is on the particular control panel. For another example, social photos or photos of groups of people may be prioritized for display according to the user's gaze being on a particular group photo.

Some embodiments of the present invention enable some objects to load more easily than other objects.

Some embodiments of the present invention have the following workflow and associated methods to implement the workflow. In this example workflow, a user if viewing objects on a webpage displaying items for sale. When the webpage viewport is loaded, an eye gaze tracking module is initiated and begins monitoring at a particular frequency the eye gaze of the user as objects displayed on the webpage are viewed according to a gaze point. The gaze point is mapped with respect to the display so that corresponding object may be identified as being at the gaze point of the user. It should be noted here that a gaze point is also known as a fixation point. As discussed herein, fixation of an eye-gaze may be considered a saccade between points within close proximity of each other. Such a saccade is referred to herein as fixation and is not to be confused with the term saccade, as used herein, to refer to movement of an eye gaze from one object to another object.

Each time the gaze point remains on an object being displayed, a fixation point is counted. Counting fixation points according to an embodiment of the present invention includes determining a fixation count and a fixation duration. In some embodiments, counting fixation points is recorded as an object-based count. Alternatively, counting fixation points is recorded as a user-based count, where multiple users are viewing the webpage. Users are identified according to facial recognition, login method, or other methods now know or to be known in the art.

When the gaze point of a user moves to another object the saccade count and the saccade length is updated. The saccade length is the distance from the previous fixation point to the current fixation point. Further, some embodiments of the present invention apply page-type information when taking a responsive action based on the saccade length. For example, the expected saccade length is different for a webpage having only images than a webpage having both text and images.

Some embodiments of the present invention are directed to a differently-resisted dynamic decision process of whether and when to load, or pop up, other objects, given the viewing behavior toward an object. Some embodiments use an external process by which related objects are loaded, or popped-up, from objects stored at an external server.

Some embodiments of the present invention rank objects using object attribute similarity and/or meta-information similarity of the related objects with respect to an object having been viewed "sufficiently" to enable the loading of related objects. Accordingly, an object on which the eye gaze is sufficiently focused prompts a related object search. In that way, the object is used as the basis for a new related object search. The search may be performed over the internet, a connected server, or in the memory of the computing device itself.

According to some embodiments of the present invention, a ranked set of objects is displayed to the user. In some embodiments, the objects are displayed in the form of a pop up, a new, auto-loaded web page, an auto-loaded application view, in the form of a notification on the computing device, or in the form of an email notification.

An example use case illustrated in FIGS. 5A and 5B involves a socially active person who has just logged onto a social media account shown in screenshot 500*a*. Upon viewing new photo 504*a* by Baker in newsfeed 502 for a threshold amount of time, such as 5 seconds, photo analysis begins. A social media friend is wearing a black jacket in the new photo and another friend is seen passing by in the background of the photo. Because the two social media friends share a strong social relationship, the new photo is assigned a low expansion resistance with respect to the social media friend. The social media friend has posted five different photos 508, 510, 512, 514, 516 taken at the party where the new photo was taken. Analysis of the five photos reveals, four photos show the social media friend wearing the black jacket and two of five photos include the other friend in the foreground. Responsive to this analysis driven by eye gaze 506 directed to the new photo in the newsfeed, the five different photos are loaded up (such as in form of a Java script enabled pop up). Eye gaze 506 shown in FIG. 5B is sufficient to emphasize the Baker photo 504*b* by increasing the relative size compared to photos 518 and 520. The five photos are arranged in the pop-up to display the first two photos (516, 514) of the social media friend wearing the black jacket when the other friend is also shown, the next two photos (510, 512) show the social media friend wearing the black jacket without the other friend being shown, and the last photo (508) shows a photo taken at the party without the social media friend or the other friend being depicted.

Another example use case involves a user looking for a washing machine at an online store. The user prefers the whirl-bath brand front loading model on the catalog page. It is silver-colored with a shining grey dashboard. The user clicks on the whirl-bath model and the web page loads the image. The use then looks intently at the top door photos and at the dashboard photos but does not look for very long at the electrical socket design photos. Further, previous experiences shopping for appliances online are stored, disclosing careful inspection of washing machine dashboards such that an eye-gazing record was made. The specific duration of an eye gaze to determine whether the gaze is fixed or focused on an object varies according to governing preference. In this example the eye gaze remained on the dashboard for five seconds, triggering emphasis of the dashboard. An eye-gazing history supports performing a new search for washing machines such that additional dashboard photos of the washing machine are loaded and pop up for display to the user. Further, at the bottom of the display, a few additional images related to the front loading door are displayed by a pop-up mechanism. According to embodiments of the present invention no other images, such as the electrical socket design, are loaded or displayed to the user.

Figure 4:
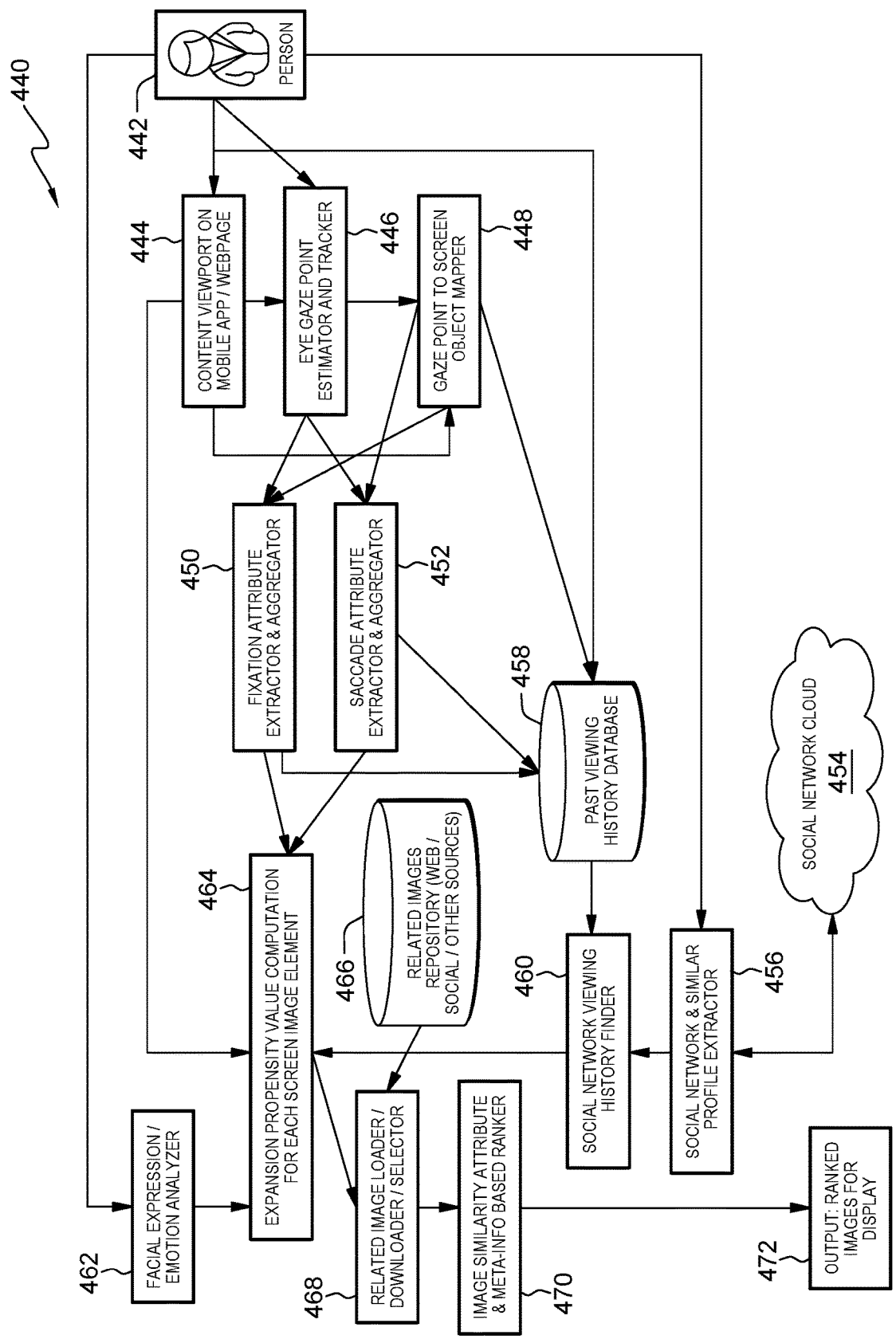
FIG. 4 is a system flowchart view of a second embodiment system according to the present invention.

FIG. 4 shows system flowchart 440 depicting a second method according to the present invention. This method will now be discussed, over the course of the following paragraphs, with extensive reference to FIG. 4 while drawing functionality from a networked computers system such as the one illustrated in FIG. 1.

Processing begins at step 442 where a user views a webpage displayed on a computing device such as display sub-system 102 via content viewport 244 where an eye gaze point software is enabled.

Processing proceeds to step 446 where eye gaze point software estimates the location of the eye gaze point on the viewport and tracks movement of the eye gaze to determine eye gaze characteristics.

Processing proceeds to step 448 where the eye gaze point is mapped to an object displayed on the viewport. Upon determining a fixation characteristic of the eye gaze and a location of the fixation point on the viewport, the eye gaze point is mapped to an object or feature of an object for analysis of the object.

Processing proceeds to step 450 where the fixation attribute extractor identifies attributes of the object or the feature that is the subject of the eye gaze fixation. In some embodiments, attributes are aggregated prior to a similarity determination for other objects.

Processing proceeds to step 452 where the saccade attribute extractor identifies attributes of any objects or features associated with the saccade eye-gaze. In some embodiments a saccade is identified to be a reading motion and no object analysis is performed. Alternatively, a repetitive saccade to and from certain aspect of a displayed object indicates multiple features of an object to be analyzed for similarity determination.

Processing proceeds to step 454 where social networks are accessed to develop a user profile to identify similar profiles and corresponding eye gaze patterns and characteristics.

Processing proceeds to step 456 where similar profiles are identified and eye-gaze characteristics and/or patterns are obtained for the users associated with the similar profiles.

Processing proceeds to step 458 where past viewing history database is accessed to identify previous gazing activity and characteristics of the user.

Processing proceeds to step 460 where social network viewing history is identified in the past viewing history database. The social network viewing history serves to identify similar photos when the object being viewed is a photo of friends. In some embodiments, an object being viewed includes a social friend and an item of interest, such as an automobile driven by the friend. The eye gaze points, when analyzed, may result in display of automobiles and associated friends prioritized by which objects are more often at the eye gaze point location.

Processing proceeds to step 462 where facial expression emotion analyzer determines the emotion of the user when viewing the webpage and corresponding objects. Where different emotions are identified for different observed objects, analysis of the objects in view of the detected emotions drives a prioritized display of similar objects based on preferred emotion.

Processing proceeds to step 464 where the collected attributes and characteristics of objects and eye gazing are analyzed to assign expansion propensity values to each screen element of the viewed webpage.

Processing proceeds to step 466 where related image stores are accessed to identify related and similar images having the highest expansion propensity according to the analysis of step 464.

Processing proceeds to step 468 where the identified related images are selected and loaded for further analysis.

Processing proceeds to step 470 where the image similarity attributes and meta-data are evaluated for each selected image, or object, of step 468. The selected objects are ranked according to likelihood to be of interest to the viewing user.

Processing ends at step 472 where the ranked set of images are displayed to the user. In this example the top 3 ranked objects are displayed to the user. Alternatively, each ranked object is selectably displayed in order of ranking so the viewing user may select those ranked objects to be continuously viewed.

Some embodiments of the present invention are directed to enabling resisted loading of objects and displaying of the objects to a user by identifying similar aspects and/or attributes of the object. An object including a still image, document, application, and/or video image.

Some embodiments of the present invention do more than merely recommend products based upon eye gaze tracking and performing cognitive filtering for dynamic product recommendations based upon eye gaze.

Some embodiments of the present invention are directed to generating image-loading resistances for varying objects using the similarity of attributes of objects receiving sufficient eye-gaze of a user. Further, the image-loading resistance operates to display to a user a portion of the set of objects on a webpage by eye-gaze attributes to determine which objects of a webpage to load while the webpage is viewed by the user.

Some embodiments of the present invention are directed to a computer-implemented method for selective display of object on a webpage, the method comprising: monitoring an eye gaze of a user viewing a set of objects displayed on a webpage; determining an eye gaze pattern of the user; determining the eye gaze is fixed at a gaze point according to the eye gaze pattern; mapping the gaze point to a first object of the set of objects; analyzing the first object for attributes; assigning a loading resistance to the set of objects such that objects having multiple matching attributes have a low loading resistance and objects no matching attributes have a high loading resistance, the loading resistance being a degree of similarity and display of the objects in set of objects being according to a threshold value of loading resistance; assigning the threshold value as the low loading resistance; and displaying to the user the objects assigned the low loading resistance. According to some embodiments of the present invention the webpage includes results from an image search of the internet.

Some embodiments of the present invention may include one, or more, of the following features, characteristics and/or advantages: (i) selecting images for "expansion" or emphasized display according to varying "resistances" of the images to being displayed according to the eye gaze of a user; (ii) when a user views a photo of a group of friends displayed on a computing device, additional display of other photos of related friends, other photos containing many of the same friends as in a reference photo, and photos of friends with similar interests to the group of friends is performed; and (iii) when a user views a photo of a product of interest on a digital catalog additional display of other photos of the product or photos of other related products is performed.

Some helpful definitions follow:

Present invention: should not be taken as an absolute indication that the subject matter described by the term "present invention" is covered by either the claims as they are filed, or by the claims that may eventually issue after patent prosecution; while the term "present invention" is used to help the reader to get a general feel for which disclosures herein that are believed as maybe being new, this understanding, as indicated by use of the term "present invention," is tentative and provisional and subject to change over the course of patent prosecution as relevant information is developed and as the claims are potentially amended.

Embodiment: see definition of "present invention" above—similar cautions apply to the term "embodiment."

and/or: inclusive or; for example, A, B "and/or" C means that at least one of A or B or C is true and applicable.

User/subscriber: includes, but is not necessarily limited to, the following: (i) a single individual human; (ii) an artificial intelligence entity with sufficient intelligence to act as a user or subscriber; and/or (iii) a group of related users or subscribers.

Module/Sub-Module: any set of hardware, firmware and/or software that operatively works to do some kind of function, without regard to whether the module is: (i) in a single local proximity; (ii) distributed over a wide area; (iii) in a single proximity within a larger piece of software code; (iv) located within a single piece of software code; (v) located in a single storage device, memory or medium; (vi) mechanically connected; (vii) electrically connected; and/or (viii) connected in data communication.

Computer: any device with significant data processing and/or machine readable instruction reading capabilities including, but not limited to: desktop computers, mainframe computers, laptop computers, field-programmable gate array (FPGA) based devices, smart phones, personal digital assistants (PDAs), body-mounted or inserted computers, embedded device style computers, application-specific integrated circuit (ASIC) based devices.

What is claimed is:

1. A computer-implemented method comprising:
    monitoring eye movement of a user for a triggering gaze while the user views a set of displayed objects, the triggering gaze being a series of saccades within an area of view such that the eye movement remains fixed at a general location;
    determining a first object of the set of displayed objects to be a focus of the triggering gaze, the first object being a photograph;
    responsive to determining the focus of the triggering gaze, determining, for the first object, a length of time for the triggering gaze to remain fixed before analyzing the photograph according to a first person depicted in the photograph, wherein the length of time is based on social strength of familiarity with the first person, the stronger the social strength, the shorter the length of time before analyzing the photograph;
    responsive to the length of time being met, analyzing the photograph for a set of features, the set of features including an event at which the photograph was taken and other people in the photograph;
    retrieving metadata associated with the photo, the metadata identifying a first event at which the photograph was taken;
    identifying a first feature within the set of features, the first feature being a social media contact shown in the photograph according to a social media account of the user;
    identifying a second feature within the set of features, the second feature being the first event;
    responsive to identifying the first feature and the second feature, searching an object store for a second object including the first person, the social media contact, and the first event; and
    displaying the second object to the user.

2. The computer-implemented method of claim 1, wherein the objects of the set of displayed objects have pre-defined characteristics stored as metadata.

3. The computer-implemented method of claim 1, further comprising:
    responsive to determining the focus of the triggering gaze, displaying the first object as an emphasized display relative to the display of other displayed objects in the set of displayed objects.

4. The computer-implemented method of claim 3, wherein the emphasized display is a display of the first object larger in size than each display of the other displayed objects.

5. A computer program product comprising a computer-readable storage medium having a set of instructions stored therein which, when executed by a processor, causes the processor to selectively display objects to a user by:
monitoring eye movement of a user for a triggering gaze while the user views a set of displayed objects, the triggering gaze being a series of saccades within an area of view such that the eye movement remains fixed at a general location;
determining a first object of the set of displayed objects to be a focus of the triggering gaze, the first object being a photograph;
responsive to determining the focus of the triggering gaze, determining, for the first object, a length of time for the triggering gaze to remain fixed before analyzing the photograph according to a first person depicted in the photograph, wherein the length of time is based on social strength of familiarity with the first person, the stronger the social strength, the shorter the length of time before analyzing the photograph;
responsive to the length of time being met, analyzing the photograph for a set of features, the set of features including an event at which the photograph was taken and other people in the photograph;
retrieving metadata associated with the photo, the metadata identifying a first event at which the photograph was taken;
identifying a first feature within the set of features, the first feature being a social media contact shown in the photograph according to a social media account of the user;
identifying a second feature within the set of features, the second feature being the first event;
responsive to identifying the first feature and the second feature, searching an object store for a second object including the first person, the social media contact, and the first event; and
displaying the second object to the user.

6. The computer program product of claim 5, wherein the objects of the set of displayed objects have pre-defined characteristics.

7. The computer program product of claim 5, further causing the processor to selectively display objects to a user by:
responsive to determining the focus of the triggering gaze, displaying the first object as an emphasized display relative to the display of other displayed objects in the set of displayed objects.

8. The computer program product of claim 7, wherein the emphasized display is a display of the first object larger in size than each display of the other displayed objects.

9. A computer system comprising:
a processor set; and
a computer readable storage medium;
wherein:
the processor set is structured, located, connected, and/or programmed to run program instructions stored on the computer readable storage medium; and
the program instructions which, when executed by the processor set, cause the processor set to selectively display objects to a user by:
monitoring eye movement of a user for a triggering gaze while the user views a set of displayed objects, the triggering gaze being a series of saccades within an area of view such that the eye movement remains fixed at a general location;
determining a first object of the set of displayed objects to be a focus of the triggering gaze, the first object being a photograph;
responsive to determining the focus of the triggering gaze, determining, for the first object, a length of time for the triggering gaze to remain fixed before analyzing the photograph according to a first person depicted in the photograph, wherein the length of time is based on social strength of familiarity with the first person, the stronger the social strength, the shorter the length of time before analyzing the photograph;
responsive to the length of time being met, analyzing the photograph for a set of features, the set of features including an event at which the photograph was taken and other people in the photograph;
retrieving metadata associated with the photo, the metadata identifying a first event at which the photograph was taken;
identifying a first feature within the set of features, the first feature being a social media contact shown in the photograph according to a social media account of the user;
identifying a second feature within the set of features, the second feature being the first event;
responsive to identifying the first feature and the second feature, searching an object store for a second object including the first person, the social media contact, and the first event; and
displaying the second object to the user.

10. The computer system of claim 9, wherein the objects of the set of displayed objects have pre-defined characteristics.

11. The computer system of claim 9, further causing the processor set to selectively display objects to a user by:
responsive to determining the focus of the triggering gaze, displaying the first object as an emphasized display relative to the display of other displayed objects in the set of displayed objects.

12. The computer system of claim 11, wherein the emphasized display is a display of the first object larger in size than each display of the other displayed objects.

13. The method of claim 1, wherein:
the set of displayed objects are social media posts; and
the set of features includes content depicted in the social media posts.

14. The method of claim 1, further comprising:
identifying clothing worn by the first person depicted in the photograph;
wherein:
the set of features further includes the clothing worn by the first person.

15. The method of claim 1, wherein the triggering gaze is further defined as when the eye movement remains fixed at the general location for a plurality of seconds while monitoring eye movement, the plurality of seconds being more than a threshold number of seconds.

* * * * *